United States Patent [19]

Rychlewski et al.

[11] 3,751,593

[45] Aug. 7, 1973

[54] MULTIPLEX IMAGE ACCOMMODATION SYSTEM

[75] Inventors: Thaddeus V. Rychlewski; Louis R. Wanner, both of Seneca Falls, N.Y.

[73] Assignee: GTE Sylvania Incorporated, Seneca Falls, N.Y.

[22] Filed: Feb. 14, 1972

[21] Appl. No.: 225,825

[52] U.S. Cl. .......... 178/7.2, 178/DIG. 28, 178/7.89, 352/79

[51] Int. Cl. .......... H04n 5/36

[58] Field of Search .......... 178/DIG. 6, DIG. 23, 178/DIG. 28, 7.2, 7.85, 7.89, 7.92; 352/79, 142; 355/201; 350/169, 171, 172

[56] References Cited

UNITED STATES PATENTS

| | | | |
|---|---|---|---|
| 3,663,750 | 5/1972 | Beiser | 178/DIG. 28 |
| 2,480,423 | 8/1949 | Simmon | 178/7.89 |
| 3,104,283 | 9/1963 | Moller | 178/DIG. 23 |
| 3,604,850 | 9/1971 | Eckenbrecht et al. | 178/DIG. 28 |

FOREIGN PATENTS OR APPLICATIONS

| | | | |
|---|---|---|---|
| 874,676 | 8/1961 | Great Britain | 178/DIG. 28 |
| 1,118,603 | 11/1961 | Germany | 352/142 |

OTHER PUBLICATIONS

Glasford–Fundamentals of Television Engineering–McGraw-Hill Book Company–1955–pages 477–481.

*Primary Examiner*—Robert L. Griffin
*Assistant Examiner*—Joseph A. Orsino, Jr.
*Attorney*—Norman J. O'Mally, Frederick H. Rinn et al.

[57] ABSTRACT

The invention concerns an improvement in the film image accommodation section of an optical-to-electrical image transducer employed in the system for displaying film images on the screen of a television display device. The improved image accommodation section includes two related optical systems, each being expeditiously modifiable to handle a plurality of image areas and film media. A moving beam of scanning light is directed to at least one of the optical systems by pivoted reflective means; the designate positioning of which is determined by placement means activated by selective switching means. The output beam of modified optical information is directed to a signal conversion section, and thence applied to the television display device.

7 Claims, 9 Drawing Figures

MULTIPLEX IMAGE ACCOMMODATION SYSTEM

BACKGROUND OF THE INVENTION

This invention relates to the presentation of film imagery in a television display device and more particularly to an improved system for expeditiously accommodating film imagery of diverse areas and media format for reproduction display in a television display device.

There is a growing desire among the television viewing public, as well as in specialized commercial, industrial and educational endeavors, to utilize television receivers and associated types of display devices for presenting program displays of slide transparencies, film strips, and movies. It has been found that a television type of display device, such as a receiver or monitor, manifests several significant advantages over an optical projection type of display. Film mediums optically projected in the conventional manner usually require a viewing environment having a very low level of ambient light such as evidenced in a darkened room. Most of the cooling means associated with the high intensity lamps, necessarily employed in optical projectors, commonly produce ambient noise of an annoying and detracting level. And, in addition, optical projectors ordinarily have little or very limited means to compensate for inconsistencies and degradations that may be present in the film image quality. In contrast thereto, the foregoing exemplary disadvantages, generally inherent in optical projection, are adequately overcome in a television display presentation. Such advantageous results are achieved by employing an image reproduction system utilizing a flying spot scanner tube to scan the image area of a film, an optical-to-electrical transducer for converting the optical information, derived from scanning the film image, to corresponding electrical signals, and a signal processing means wherefrom the signals are applied to a television display device adapted to reproduce the desired image display on the screen thereof. Such reproducing systems usually have limited film accommodation means, i.e., some are formed to accept slide transparencies, while others are adapted to handle moving film mediums. There are occasions when a television type of display is desired to present a preselected and varied program representing an intermixture of related subjects in the form of slides, movies or other film media having diverse image areas, but such viewing is not feasible with the conventional film accommodation systems normally available.

OBJECTS AND SUMMARY OF THE INVENTION

It is an object of the invention to reduce the aforementioned disadvantages and to provide a multiplex image film accommodation section of an optical-to-electrical image transducer to be used in conjunction with a television display device. Another object is to provide a film accommodation section that has related provisions for optically and physically accommodating a plurality of film image formats and film media. A further object is to effect film accommodation in an expeditious manner wherein specific and inter-related means are provided for handling various areas of film imagery in both still and moving format.

The foregoing objects are achieved in one aspect of the invention wherein a multiplex film accommodation section is provided for an optical-to-electrical image transducer employed to convert optical imagery to electrical signal output translatable to form a reproduction of the imagery on the screen of a television display device. The film image accommodation section utilizes a moving beam of scanning light having a defined raster pattern and includes at least two basic optical systems, each of which is formed to accommodate a specific type of film media. Each of the basic optical systems is formed to employ an adjuvant lens system for handling an image area of a size differing from that inherently accommodated by the respective basic system. A pivoted reflective means is oriented to predeterminately receive the raster of scanning light and direct the same to at least one of the basic optical systems. Placement means, utilized to selectively position the pivoted reflective means, are activated by selective switching means. Thus, the moving light beam, being directed through a respective optical system, scans the desired image area accommodated therein. The resultant output of modified radiant energy optical information derived from the image is directed to a signal conversion system, and the signal output therefrom applied to the television display device for image reproduction.

DESCRIPTION OF THE PREFERRED EMBODIMENT

For a better understanding of the present invention, together with other and further objects, advantages, and capabilities thereof, reference is made to the following specification and appended claims in connection with the aforedescribed drawings.

To achieve clarity in the several schematic figures, the various lens designations, while broadly shown as single lenses, are intended to denote a variety of lens configurations and multiple lens combinations as are necesary to fulfill the intended functions within the respective optical systems. Similarly, the term "lens" as used in the specification and appended claims is also intended to broadly encompass a variety of lens configurations and combinations.

Figure 1A:
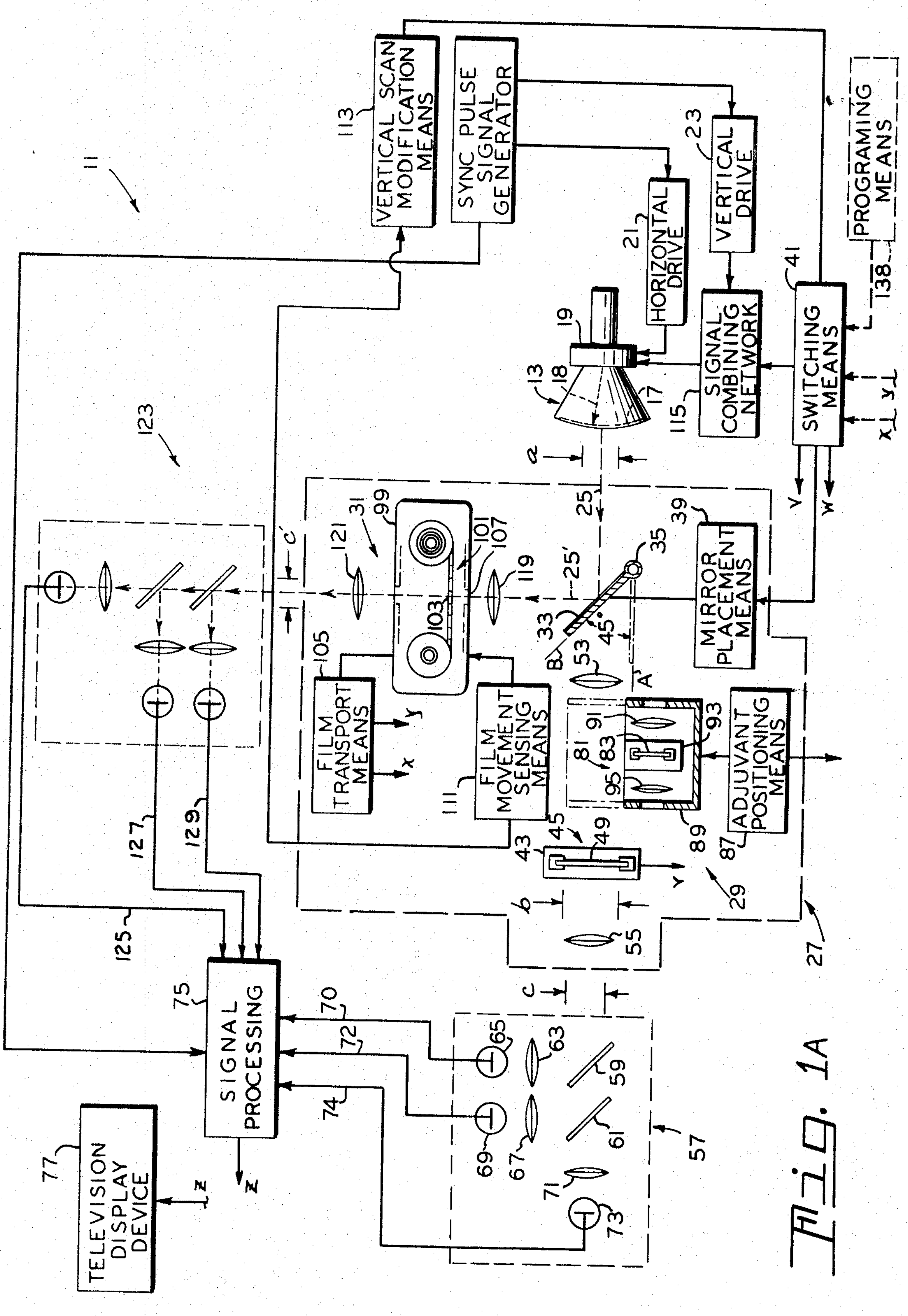
FIG. 1A is a schematic view showing an optical-to-electrical image transducer utilizing the multiplex image accommodation system of the invention.
Figure 1B:
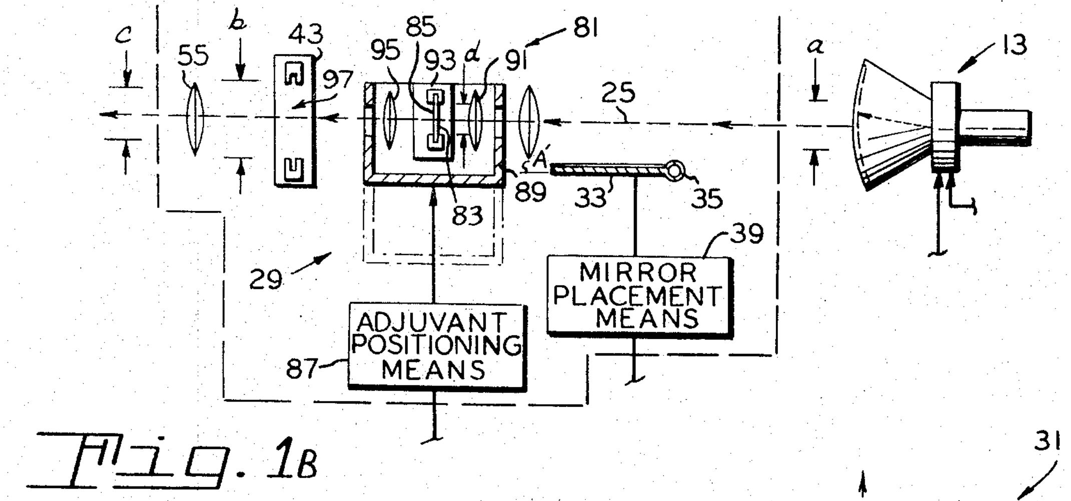
FIG. 1B is a view particularly illustrating utilization of one of the basic optical systems included in FIG. 1A.
Figures 1C, 1D, 1E:
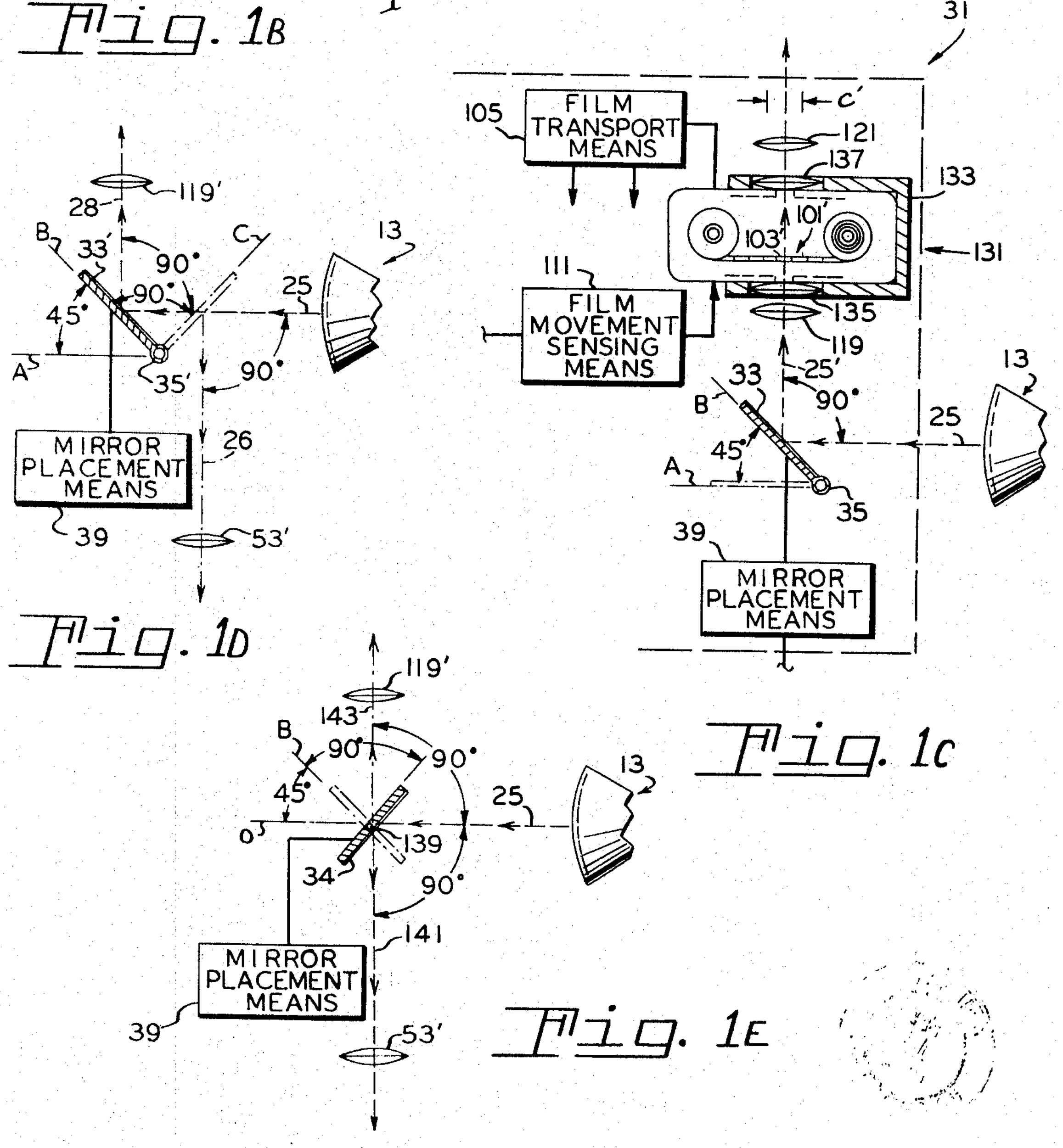
FIG. 1C is a view illustrating utilization of the other of the basic optical systems shown in FIG. 1A.
FIGS. 1D and 1E are illustrations showing other embodiments of the pivoted reflective means applicable to the invention shown in FIG. 1A.

With reference to the drawings, there is shown in FIGS. 1A, 1B and 1C one embodiment of the invention wherein a plurality of film mediums, representing diverse image areas, are accommodated to provide image reproduction on the screen of an associated television display device. Schematically illustrated is an optical-to-electrical image transducer system 11 which is constructed to physically and optically handle the film imagery, converting the same to signal modifications intended for display on the television screen.

Included in the transducer system 11 is a radiant energy scanning means 13 in the form of a flying spot scanner cathode ray tube having a faceplate with a cathodoluminescent screen 17 disposed on the interior surface thereof. To control movement of the electron beam 18 within the tube, there is mounted on the neck portion of the scanner tube 13 a suitable deflection apparatus 19 to which horizontal and vertical deflection and control signals are applied from deflection and control sources 21 and 23 respectively. Impingement of the moving electron beam 18 on the cathodoluminescent screen 17 excites the phosphor therein and produces a projecting luminescent moving beam of radiant energy or light 25 having a defined output raster pattern dimensionally defined as *a*.

The moving light beam 25 emanating from the screen of the scanner tube is directed to the improved multiplex film image accommodation system or section 27 wherein two related basic optical systems 29 and 31 are included. Adjacent to the face of the scanning means 13, there is a pivoted or hinged reflective means or mirror 33 oriented in a manner to be angularly moved into the path of the light beam 25 to, on occasion, predeterminately direct the path of the moving beam 25 to a designated basic optical system. In greater detail, the pivoted mirror has substantially edge-oriented pivotal means 35 which facilitates substantially 45° angular movement of the pivoted mirror 33 between planes "A" and "B." This angular positioning is initiated from a reference plane "A" which is substantially parallel to and spaced from the direct beam path 25 emanating from the axis of the raster pattern of the scanning cathode ray tube 13. The pivotal region 35, being oriented laterally beyond the beam path confines of the raster pattern, facilitates positioning of the pivoted mirror into and out of the path of the moving light beam thereby allowing direct light beam input into a first basic optical system 29 and, selectively in turn, providing a substantially 90° mirror reflected beam of light input 25′ into a second basic optical system 31. The respective positioning of the pivoted mirror 33 is effected by mirror or reflective placement means 39 incorporating mechanical, electrical or fluidic manipulation controllable by master selective switching means 41.

With the aforementioned pivoted mirror 33 being in reference plane "A" position, the scanning light 25 is beamed directly into the first basic optical system 29 which includes a first film positioning means 43 constructed to accommodate a first substantially transparent still image film medium 45 having a defined image area 49. For instance, the first film medium may be a slide transparency, such as a conventional 35 mm format, or a glass substrate medium, but such are not to be considered limiting. The film positioning means 43 for handling the first still film medium 45 is intended to include associated slide-changing facilities. A first objective lens 53 is positioned to receive the moving beam of scanning radiant energy or light 25 having a raster dimension of "*a*" and focuses the luminescent raster pattern thereof on the image area 49 of the first film medium. A first condensing lens 55 collects the modified radiant energy, areally dimensioned as "*b*," that is passed by the first film image area 49, and reduces this area of radiant energy to an output dimensional area of "*c*" which is acceptable by a first signal conversion system 57, wherein the optical information is converted to electrical signals.

The modified light beam 25, upon entering the signal conversion section 57, is directed to a light splitting arrangement which includes first and second dichroic mirrors, 59 and 61 respectively. The first dichroic mirror 59 selectively reflects one color component of the impinging light beam, directing the same to a secondary condensing or collecting lens 63 which collects the light of the particular color component and directs it to a photosensitive device 65, such as for example a photomultiplier tube. The remaining portion of the modified light beam incident on the first dichroic mirror 59 passes therethrough and strikes the second dichroic mirror 61. This mirror, in similar manner, selectively reflects a second discrete portion of the light representing another color component to a different secondary condensing lens 67 which directs the selected light to another photosensitive device 69. The remaining light passing through the second dichroic mirror 61, and representing a third color component of the image, is collected by yet another secondary condensing lens 71 and directed to still a third photosensitive device 73. The several photosensitive devices 65, 69 and 73 are responsive to the discrete light intensities respectively incident thereon, thereby producing separate electrical signal outputs that represent the respective light intensities of the several color components making up the modified light beam 25. These output electrical signals are then applied by respective coupling means 70, 72, and 74 to signal processing circuitry 75. This signal processing section, in turn, translates the received signals to appropriate output signals of the type usable in the television display device 77 to effect a reproduction display of the film image 49. These discrete output signals are conveyed to the TV device 77 by wire or wireless means as indicated by the 2—*z* connection.

The described first basic optical system 29 is formed to accept a cooperating auxiliary optical system 81 which is insertable into the system to accommodate an additional film medium 83 having an image area 85 of a size smaller than that inherently accommodated by the first basic system 29. This auxiliary system includes an adjuvant positioning means 87 by which the auxiliary system holding arrangement 89 is inserted into and removed from the optical alignment of the first basic optical system 29, the predeterminate positional shifting of which is shown in FIGS. 1A and 1B. The auxiliary optical system 81 includes an adjuvant objective lens 91 which functions conjunctively with the first objective lens 53, when brought into alignment therewith as illustrated in FIG. 1B. This conjuctive optical action reduces the size of the scanning raster pattern area of the moving beam 23 to a dimensional area "*d*" and focuses the same on the smaller image area 85 of the film medium 83 which is supported in the auxiliary film positioning means 93. An adjuvant condensing lens 95 is also included in the auxiliary system in a manner to function conjunctively with the first condensing lens 55 to control the output dimensional area "*c*" of the modified beam of radiant energy which is passed by the image area of the additional film medium 83. The beam of moving light 25, after scanning the image area 85 of the additional film medium, passes through the adequate opening-area 97 of the first film positioning means 43, the first film medium 45 being removed therefrom.

When it is desired to direct the moving beam of scanning light 25 to the second basic optical system 31, the second system pivoted mirror 33 is angularly repositioned, as aforedescribed, through an angle of substantially 45 degrees from reference plane "A" to utilization plane "B," into the path of the moving light beam condition under which a color receiver must operate insofar as the above distortions are concerned:

$$E_1 = 0.14 \text{ (1 MHz)} \quad (6)$$

$$E_2 = 0.447 \text{ (4.5 MHz)} \quad (7)$$

$$E_3 = 0.176 \text{ (3.58 MHz)} \quad (8)$$

$$E_p = 0.258 \text{ (picture Carrier)} \quad (9)$$

In the foregoing expressions (6), (7), (8) and (9), the numerical values are the peak amplitudes of the modulation components at the respective indicated frequencies at and away from the picture carrier relative to the peak amplitude of the picture carrier as transmitted, i.e., prior to passage through the conventional IF pass-band network of a receiver.

Now in the circuit arrangement of the invention, there will be attenuations $\alpha$, $\beta$ and $\gamma$ for $E_1$, $E_2$, and $E_3$ respectively with respect to $E_p$ so that the values given above become:

$$E_1 = 0.14\ \alpha \quad (10)$$

$$E_2 = 0.447\ \beta \quad (11)$$

$$E_3 = 0.176\ \gamma \quad (12)$$

$$E_p = 0.258 \quad (13)$$

Substituting equations (10) to (13) into equations (3), (4) and (5), $$m_1 = 0.14\alpha/0.258 = 0.541\alpha \quad (14)$$

$$m_2 = 0.447\beta/0.258 = 1.73\beta \quad (15)$$

and $$m_3 = 0.176\gamma/0.258 = 0.681\gamma \quad (16)$$

Now substituting equations (14) to (16) into equations (1) and (2), $$m_1m_2 = 0.935\alpha\beta \text{ ("tish")} \quad (17)$$

$$m_2m_3 = 1.18\beta\gamma \text{ (920 KHz)} \quad (18)$$

In order to determine the relative visibility of these distortion components in the reproduced picture, it is necessary that they be compared respectively to the amplitude of the maximum 3.58 MHz signal in the system and to the amplitude of the maximum low frequency picture signal relative to the picture carrier. For this purpose, the maximum low frequency signal is selected to be close enough to the picture carrier that it is not affected by the transfer characteristic $\alpha$ and thus is $m_1/\alpha$. This is done by taking the ratios:

$$\text{ratio}_1 = \text{tish signal } (m_1m_2)/\text{max 3.58 MHz sig.}(m_3) = 0.935\alpha\beta/0.681\gamma = 1.37\alpha\beta/\gamma \quad (19)$$

$$\text{ratio}_2 = \frac{\text{920 KHz. signal}(m_2m_3)}{\frac{m_1}{\alpha}} = \frac{1.18\beta\gamma}{0.541} = 2.18\beta\gamma \quad (20)$$

From the latter equations (19) and (20), it can be observed that:

a. the factor $\alpha\beta/\gamma$ should be selected so that $\text{ratio}_1$ will be some moderately small fraction resulting in the reproduced picture chroma having negligible "tish," and b. the factor $\beta\gamma$ should be selected so that $\text{ratio}_2$ will be some small fraction such as 0.01 resulting in the 920 KHz beat signal being negligible in the reproduced picture luminance. Substituting 0.01 for $\text{ratio}_2$ in equation (20):

$$\beta\gamma = 0.01/2.18 = 0.00458 \text{ or } -46.8 \text{ db} \quad (21)$$

The choice of $\beta\gamma$ is fairly easy to make, but the choice of a tolerable value for $\alpha\beta/\gamma$ in equation (19) is considerably more difficult. For one thing, the NTSC system is supposed to be a "constant luminance" system. This can only mean that a disturbance in the chroma channel will not appear as a luminance disturbance, but only as a hue disturbance, and the eye is said to be much more aware of a luminance disturbance than of a chrominance disturbance. The question is, therefore, what exactly, in numbers, do the relative amplitudes become to cause equal annoyance. Another factor to be considered is the frequency of occurrence of luminance signals in the video frequency range of 920 KHz ± 600 KHz of sufficient time duration and amplitude to produce tish that lasts long enough with enough intensity to be annoying. A third factor is that the heterodyne frequency produced by beating the unmodulated sound I.F. with luminance components produces so-called "low visibility" signals in the chrominance channel. The reason for this is that 4.5 MHz is the 286th harmonic of the horizontal scanning frequency whereas chroma frequencies are odd multiples of half the line frequency. Tests have shown that the interleaving produces up to 17 db of visibility protection. When the sound carrier is FM modulated, however, beats at frequencies corresponding to chroma sidebands can be produced. Usually these are fleeting by nature, and since they may occur at times when the 920 KHz ± 600 KHz amplitudes in the luminance channel are low, only part of the time is tish likely to be produced.

In the simplified circuit of FIG. 1, network 12 provides the desired shaping, i.e., values of $\alpha$, $\beta$, and $\gamma$, such that there is produced a sharp falling off of response for frequencies fairly close to the carrier frequency leveling off smoothly to a plateau for higher modulation frequencies where the attenuation is fairly constant. This is shown in FIG. 4. Network 12 comprises a shunt tuned LC circuit 22–23 tuned to the carrier frequency and connected in series with a relatively low resistance 21. The IF ahead of this point feeds the circuit 21 to 23 through a source or generator resistance 20 of relatively higher value. Using conventional network theory, the values of the components in network 12 in order to approximate the bandpass curve of FIG. 4 will be shown to be:

$R_{20} = 2.0\text{K}\ \Omega$ $R_{21} = 152\ \Omega$ $L_{22} = 0.674\ \mu\text{ hy}$ $C_{23} = 180\text{ pf}$ After detection, network 14 restores the amplitudes and phases to the original condition. The network 14 is shown as resistor 26 in shunt with capacitor 25, the shunt circuit being in series with resistor 24 in the line as shown and a resistor 27 being shunted across the line as shown. The values of the components in complementary network 14 will be shown to be:

$R_{24} \approx 0$ placement means 39, from plane "B" which is situated substantially 45° from the reference plane "A." The extent of the 90° angular movement being substantially limited from plane "B" to plane "C." To effect proper positioning, the pivotal means 35' of the hinged mirror means 33' is oriented laterally beyond the beam path of the raster pattern to facilitate the required angular movement of the pivoted mirror within the path of the scanning beam 25. By this orientation, there is effected a substantially 90° reflected beam input 26 to the objective lens 53' of a first basic optical system, and thence selectively in turn, a substantially 90° reflected light beam input 28 to the objective lens 119' of a second optical system. Thus, the reflected light beams 26 and 28, provided by the 90° mirror positioning, are substantially 180° apart and substantially offset from one another.

An additional embodiment of the pivoted reflective means is referenced in FIG. 1E wherein the pivoted mirror 34 is pivotal substantially along the lateral axis 139 thereof to facilitate substantially 90° angular movement of the mirror 34. The pivotal axis 139 is positioned in substantially the direct beam path 25 emanating from the axis of the raster pattern of the scanning means 13. The initiative position of the 90° movement of the mirror is determined from plane "B" which is situated substantially 45° from the plane of the axis of the raster pattern "O" to provide a substantially 90° reflected light beam input 141 into the objective lens 53' of a first optical system, and thence selectively in turn, a substantially 90° reflected light beam input 143 into the objective lens 119' of a second optical system. The respective reflected light beams 141 and 143 provided by the selective 90° movement of the pivoted mirror 34 are substantially 180° apart in a substantially common plane.

Figure 2A:
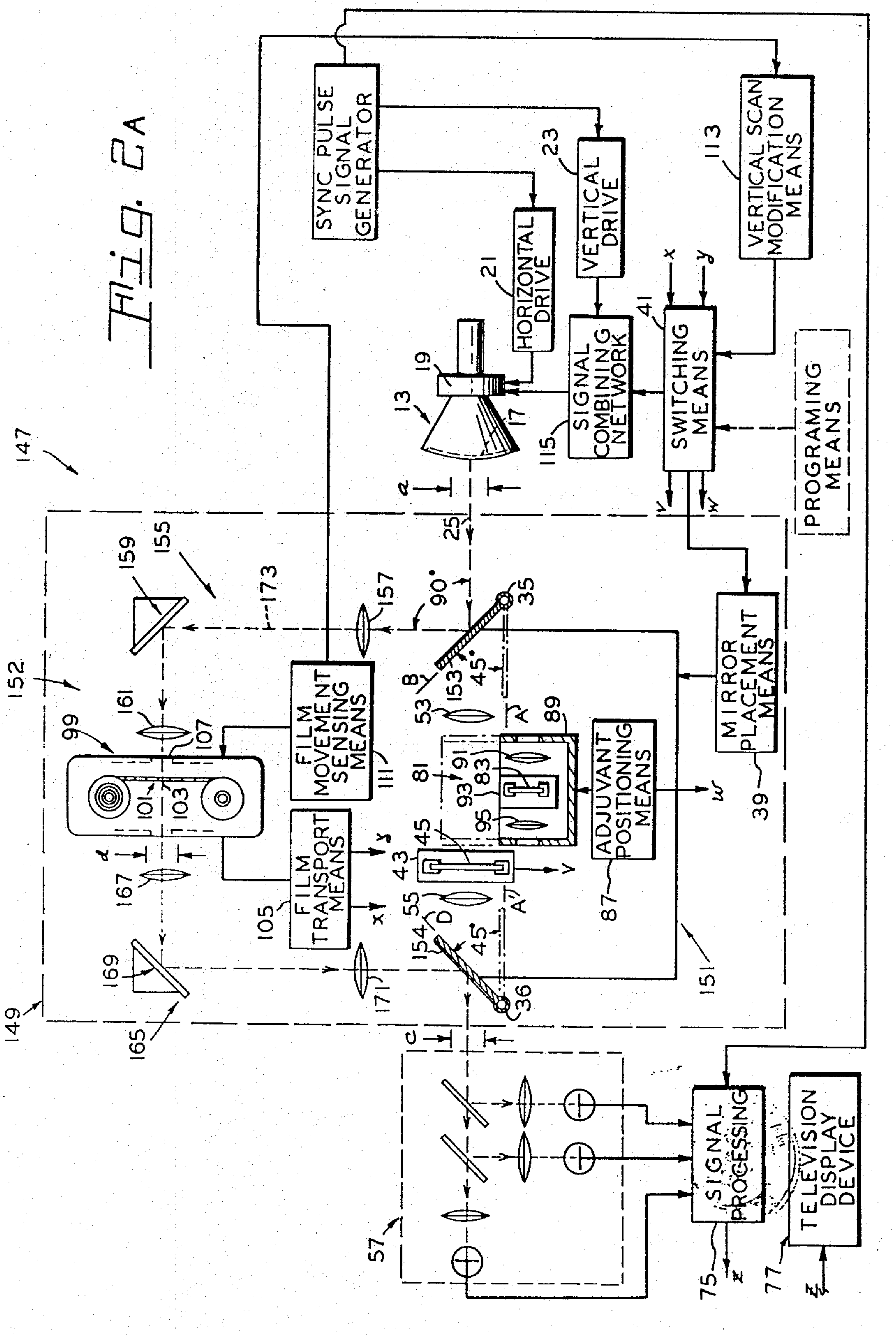
FIGS. 2A, 2B, and 3A, 3B are schematic views illustrating additional embodiments of the invention.
Figures 2B, 3B:
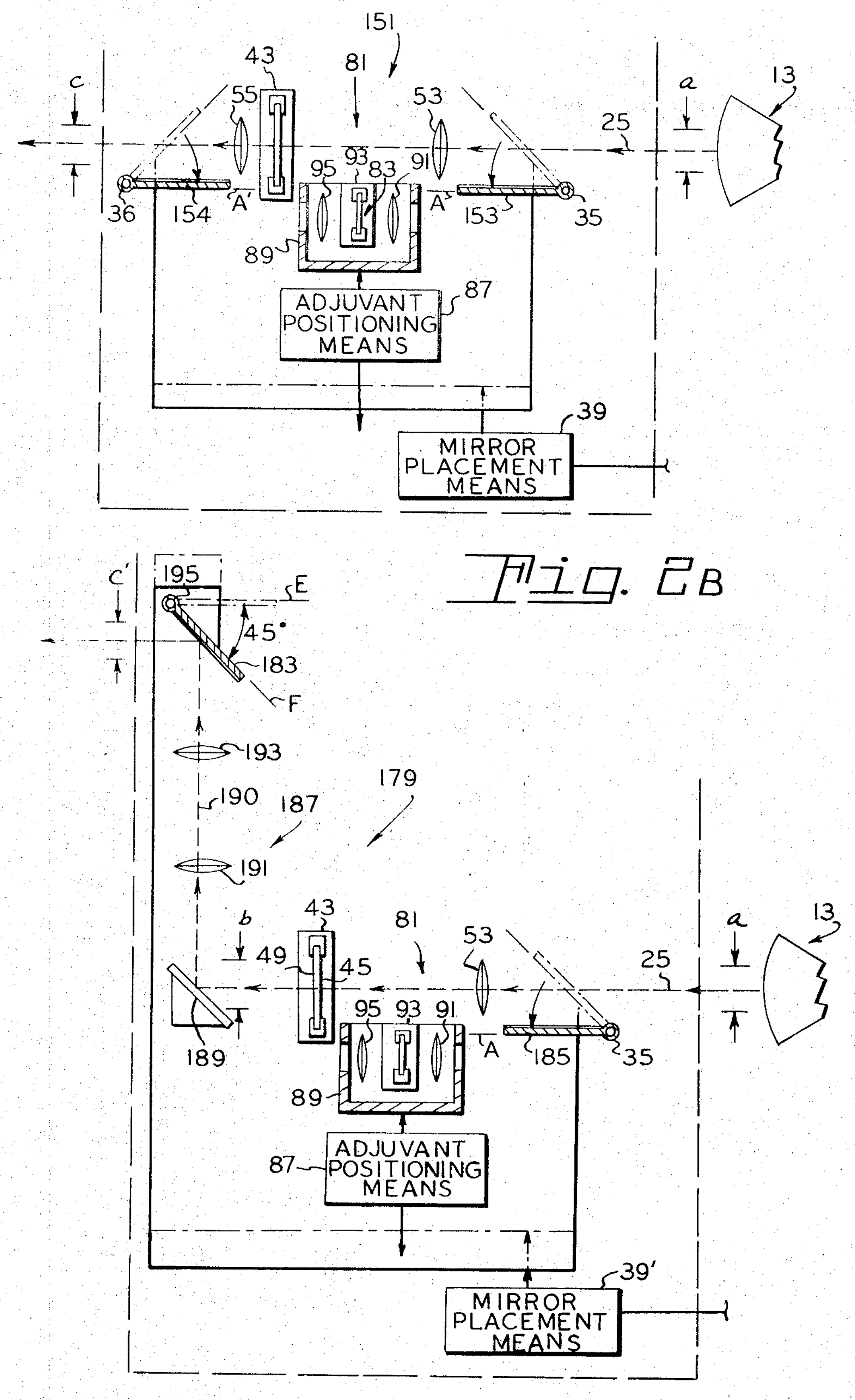

For another embodiment of the invention, particular reference is made to FIGS. 2A and 2B in conjuction with FIGS. 1A and 1B. Since the circuitry and many elements in this second embodiment of an optical-to-electrical image transducer system 147 are similar to those utilized in the first embodiment 11, detailed considerations of these common items will be eliminated from the description pertaining to the second embodiment. The moving beam of scanning light 25 emanating from the scanner tube 19 is beamed to the second embodiment of the improved multiplex film image accommodation section 149 which includes two related basic optical systems, 151 and 152 respectively, formed to handle a diversity of image sizes and film formats. The first basic system 151 is a direct-beam system, similar to the already-described first embodiment 29, and includes a first objective lens 53, a first film positioning means 43 and a first condensing lens 55 which directs the image-modified radiant energy output therefrom to a signal conversion system 57 of the type previously described. This first optic system 151 is also formed to accept a cooperating auxiliary optical system 81 for the accommodation of an additional film medium 83 having an image area of a different size.

Included in the second basic optical system 152, which differs somewhat from the second system 31 incorporated in the image accommodation section 27, are a pair of cooperating pivoted reflective means in the form of a second system input pivotal mirror 153 and a second system output pivotal mirror 154 which are positioned at either end of the first optical system 151. These mirrors are conjunctively operational to predeterminately and simultaneously move into and out of the path of the moving beam light output 25 of the scanning means to direct the beam into the second optical system and thence out of to the signal conversion system 57. Each of the pivoted mirrors 153 and 154 is pivotal along one edge thereof to facilitate substantially 45 degree angular movement of each mirror. These angular movements are simultaneously initiated from a substantially common plane "A" – "A'", which is substantially parallel to and spaced from the direct beam path 25 emanating from the axis of the raster pattern of the scanning means 13. The pivotal edges 35 and 36 of the mirrors are oriented laterally beyond the beam path confines of the raster pattern to facilitate positioning of the respective pivotal mirrors into and out of the path of the moving light beam 25. In addition the second optical system 152 includes a compound objective lens arrangement 155 comprising a primary objective lens 157, a fixed objective reflective means 159, such as a mirror or prism, and a secondary objective lens 161; a second film positioning means 99; and a compound condensing lens arrangement 165 comprising a primary condensing lens 167, a fixed condensing reflective means 169, and a secondary condensing lens 171. Operationally, when it is desired to utilize the second basic optical system 152, selective manipulation of the switching means 41 activates the mirror placement means 39, thereby simultaneously angularly moving the pair of pivoted mirrors 153 and 154 from the rest or reference positions substantially indicated in substantially the common reference plane "A" – "A'" in FIG. 2B to the respective positions in planes "B" and "D" as shown in FIG. 2A. So positioned, the input mirror 153 receives the raster pattern of the moving scanning beam 25 and reflects the same, as for example, 90° into the second basic optical system 152. The primary objective lens 157 controls and directs the reflected scanning light 173 to an angled fixed objective reflective means 159. This fixed mirror means 159, in turn redirects the light to a secondary objective lens 161 which focuses the light raster pattern on the second film image area 103 of the strip film medium 101. As aforedescribed, different types and sizes of strip film media are adequately handled in this second system. Upon passing through the image area of the film, the modified light area of the dimension "*d*" enters the compound condensing lens arrangement 165, whereupon it is at least partially collimated by the primary condensing lens 167, thence reflected by the fixed condensing reflective means 169 and directed to the secondary condensing lens 171. After leaving the condensing lens, the light impinges the angularly positioned output pivoted mirror 154 from whence the light beam is redirected, for example by 90°, to the signal conversion system 57. The second optical system 152 of the second embodiment of the multiplex image accommodation section 149 handles both types of still and moving strip film mediums as described in the first embodiment 27. Likewise, the film transport means 105, the film movement sensing means 111, the vertical scan modification means 113, the switching means 41 and the other associated circuitry elements are similarly utilized.

Figure 3A:
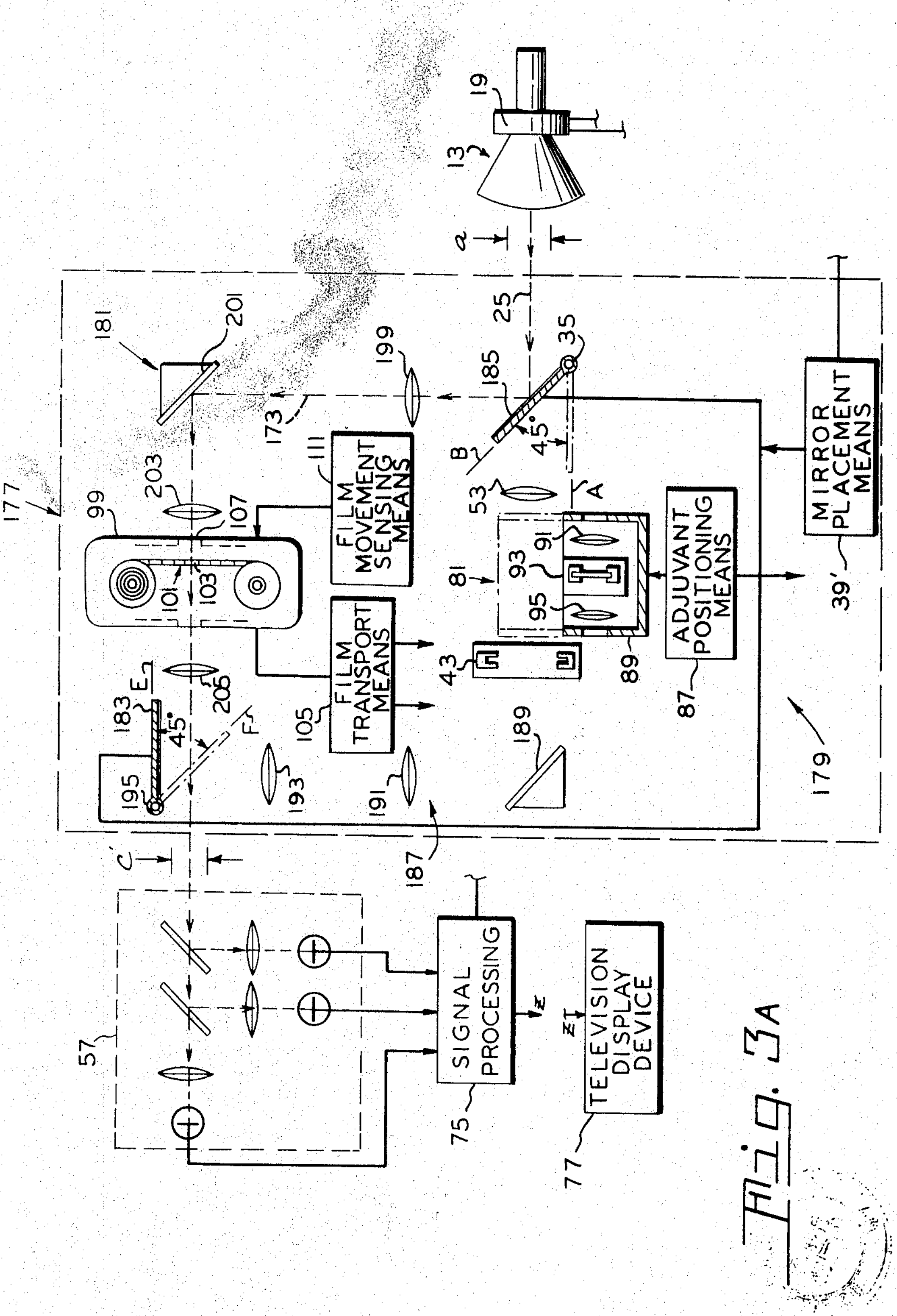

Reference is directed to FIGS. 3A and 3B wherein an additional embodiment of the invention is illustrated. In this third embodiment of the improved film image accommodation section 177, modifications are evidenced in the basic first and second optical systems 179 and 181, wherein each of the systems includes a pivoted mirror, 183 and 185 respectively. These mirrors are operated simultaneously in a reciprocating manner to achieve utilization of the respective optical systems, as subsequently described.

The first optical system 179, which is particularly shown in FIG. 3B, includes a first film positioning means 43 and has provisions for incorporating thereinto an auxiliary optical system 81 for accommodating an additional film medium having an image area of a different size; these elements being common to the aforedescribed embodiments. The first objective lens 53 is positioned to receive and focus the input radiant energy 25 on the image area of the first film medium 45. A compound condensing lens system 187 directs the radiant energy passed by the image area first system film 45 to a common signal conversion system 57. This compound lens system comprises an angled fixed reflective means oriented to redirect the light 190 passed by the film image 49 to a primary condensing lens 191 which controls and directs the beamed light to a secondary condensing lens 193. The light passing through this first system condensing lens impinges the angularly positioned first system pivoted output mirror 183 which is oriented adjacent the input receiving area of the common signal conversion system 57 in a manner to reflect the output radiant energy of the first optical system into the signal conversion system. Upon activation of the first optical system 179, the pivoted output mirror 183, having substantially edge oriented pivotal means 195, is functionally positioned in plane "F," being angularly moved thereto from a rest or reference plane "E" by mirror placement means 39'.

The second basic optical system 181 includes a second system pivoted input mirror 185 which has a pivotal edge 35, and upon activation by mirror placement means 39', is angularly repositioned from a rest or reference plane "A" to utilization plane "B. " As the second system input mirror 185 is angularly positioned to activate the second optical system by moving to receive, the scanning beam 25, the first system pivoted output mirror 183 is simultaneously moved in a reciprocating manner out of the beam path 173, i.e., from plane "F" back to reference plane "E." The scanning light 173 reflected into the second optical system 181 by the positioned pivoted input mirror 185 is directed to a primary objective lens 199 and thence to an angled fixed reflective means 201. This fixed mirror redirects the light to a secondary objective lens 203 which focuses the scanning light raster pattern on the second film image area 103 of the strip film medium 101 accommodated in film positioning means 99. As in the previously described embodiments, this second optical system 181 is formed to accept an auxiliary optical system 131 to handle strip film media of different types and sizes. After passing through the image area of the film, the modified light enters the condensing lens 205 and is thence directed to enter the common signal conversion system 57.

Thus, there is provided an improved multiplex film image accommodation section of an optical-to-electrical image transducer that is utilized in a system for reproducing enlarged displays of film imagery on the screen of a television display device. A plurality of related optical systems are employed in the film accommodation section whereby a variety of types of both still and moving film media, representing diverse formats and image areas, are expeditiously physically and optically handled. In each of the embodiments described, pivoted reflective means and associated optics are efficiently utilized to selectively control and direct the moving scanning beam to thereby achieve a multiplex system that is readily adaptable to automated programming.

While there have been shown and described what are at present considered the preferred embodiments of the invention, it will be obvious to those skilled in the art that various changes and modifications may be made therein without departing from the scope of the invention as defined by the appended claims.

What is claimed is:

1. An improvement in an optical-to-electrical image transducer employed to display the image of a film area on the screen of a television display device, said transducer having a film accommodation section wherein the film image area is scanned by radiant energy in the form of a moving beam of light emanating from the raster pattern of a scanning means, the radiant energy optical information derived from the scanned image area being directed to a signal conversion system and the signal output thereof applied to the television display device for image reproduction, said improvement being in the film image accommodation section of said transducer and comprising:

a first basic optical system including a first film positioning means for accommodating a first film medium of defined image area, a first objective lens to focus said light raster pattern on the image area of said first film, and a condensing lens to convey the radiant energy passed by the first film image area to a signal conversion system;

a second basic optical system including a second film positioning means for accommodating a second film medium having a defined format and image area substantially differing from that of said first film medium, a second system objective lens to focus said light raster pattern on the image area of said second film medium and a condensing lens to convey the radiant energy passed by the second film image area to a signal conversion system;

at least one of said basic optical systems being formed to accept the insertion of a cooperating auxiliary optical system thereinto including an adjuvant objective lens, means for accommodating an additional film medium and an adjuvant condensing lens system formed to be inserted into and removed from the optical alignment of said basic system to facilitate the predeterminate handling of an additional film medium having an image area of a size differing from that inherently accommodated by said basic optical system;

a pivoted reflective means oriented adjacent to the face of said scanning means in a manner to be angularly moved into the path of said light beam and predeterminately direct the path of the moving beam light output of said scanning means to at least one of said basic optical systems;

reflective placement means for selectively positioning said pivoted reflective means to direct said moving light beam to at least one of said respective basic optical systems; and selective switching means to control said reflective placement means to determinately position said pivoted reflective means to effect the selective utilization of a respective basic optical system.

2. An improvement in the film accommodation section of an optical-to-electrical image transducer according to claim 1 wherein one of said basic optical systems has film positioning means to accommodate separate still image film mediums and wherein the other of said basic optical systems has discrete film transport means to accommodate strip film mediums having a series of images thereon, and wherein said strip film transport means accommodates moving sequential image strip film mediums, and wherein said moving image film transport means is augmented by film movement sensing means, vertical scan modification means, and switching means; said switching means providing activation of said reflective placement means, said moving image film transport means, and said vertical scan modification means to effect scanning of said moving sequential image film mediums.

3. An improvement in the film accommodation section of an optical-to-electrical image transducer according to claim 1 wherein said pivoted reflective means is pivotal relative to one edge thereof in a manner to facilitate substantially 90° angular movement of said reflective means, said pivotal angular movement effecting positioning of said reflective means being referenced from a plane substantially parallel to and spaced from the direct beam path emanating from the axis of the raster pattern of said scanning means, the initiative 90° movement being determined from a plane situated substantially 45° from said reference plane, said pivotal edge related region being oriented laterally beyond the beam path of the raster pattern to facilitate said angular movement of said reflective means in the moving light beam path to provide substantially 90° reflected light beam input into the first of said basic optical systems and thence substantially 90° reflected light beam input into the second of said basic optical systems, said reflected light beams being substantially 180° apart and substantially offset from one another.

4. An improvement in an optical-to-electrical image transducer employed to display the image of a film area on the screen of a television display device, said transducer having a film accommodation section wherein the film image area is scanned by radiant energy in the form of a moving beam of light emanating from the raster pattern of a scanning means, the radiant energy optical information derived from the scanned image area being directed to a signal conversion system and the signal output thereof applied to the television display device for image reproduction, said improvement being in the film image accommodation section of said transducer and comprising:

a first basic optical system including a first film positioning means for accommodating a first film medium of defined image area, a first objective lens oriented to receive and focus the input radiant energy of said light raster pattern on the image area of said first film medium, and a condensing lens to convey and direct the output radiant energy passed by the first film image area to a signal conversion system, said first basic optical system being positioned in substantially direct line relationship between said scanning source and said signal conversion system;

a second basic optical system including a second film positioning means for accommodating a second film medium having a defined format and image area substantially differing from that of said first film medium, a second compound objective lens system having an associated substantially fixed reflective means to direct the focused light raster pattern on the image area of said second film medium and a second compound condensing lens system having an associated substantially fixed reflective means to convey the radiant energy passed by the second film image area to said signal conversion system;

at least one of said basic optical systems being formed to accept the insertion of a cooperating auxiliary optical system thereinto including an adjuvant objective lens, means for accommodating an additional film medium and an adjuvant condensing lens system formed to be inserted into and removed from the optical alignment of said basic system to facilitate the predeterminate handling of an additional film medium having an image area of a size differing from that inherently accommodated by said basic optical system;

a pair of cooperating pivoted reflective means in the form of a second system input pivotal mirror and a second system output pivotal mirror positioned at either end of said first basic optical system, said second system input pivotal mirror being oriented adjacent to the face of said scanning means and said second system output pivotal mirror being oriented adjacent the input receiving area of said signal conversion system, said second system input and output pivotal mirrors being conjunctively operational to predeterminately and simultaneously move into and out of the path of the moving beam light output of said scanning means to thereby direct said moving beam into said second basic optical system and thence out of to said signal conversion system; and reflective placement means for simultaneously positioning said pair of pivotal mirrors into and out of the path of said moving light beam.

5. An improvement in the film accommodation section of an optical-to-electrical image transducer according to claim 4 wherein one of said basic optical systems has film positioning means to accommodate separate still image film mediums and wherein the other of said basic optical systems has discrete film transport means to accommodate strip-type film mediums having a series of images thereon, and wherein selective switching means is included to control said reflective placement means to determinately position said pivotal mirrors to effect the selective utilization of a respective basic optical system.

6. An improvement in the film accommodation section of an optical-to-electrical image transducer according to claim 4 wherein each of said pivoted mirrors is pivotal relative to one edge thereof in a manner to facilitate substantially 45° angular movement of each mirror with each of said pivotal angular movements being simultaneously initiated from a common plane substantially parallel to and spaced from the direct beam path emanating from the axis of the raster pattern of said scanning means, each of said pivotal edge related regions being oriented laterally beyond the beam path confines of the raster pattern to facilitate positioning of the pivotal mirrors into and out of the path of said moving light beam thereby allowing direct light beam input into said first basic optical system and, selectively in turn, providing substantially 90° reflected light beam input into said second basic optical system and substantially 90° reflected light beam output therefrom to said signal conversion system.

7. An improvement in an optical-to-electrical image transducer employed to display the image of a film area on the screen of a television display device, said transducer having a film accommodation section wherein the film image area is scanned by radiant energy in the form of a moving beam of light emanating from the raster pattern of a scanning means, the radiant energy optical information derived from the scanned image area being directed to a signal conversion system and the signal output thereof applied to the television display device for image reproduction, said improvement being in the film image accommodation section of said transducer and comprising:

a first basic optical system including a first film positioning means for accommodating a first film medium of defined image area, a first objective lens oriented to receive and focus the input radiant energy of said light raster pattern on the image area of said first film medium, a compound condensing lens system having an associated substantially fixed reflective means to convey the radiant energy passed by said first film image area to said signal conversion system;

a second basic optical system including a second film positioning means for accommodating a second film medium having a defined format and image area substantially differing from that of said first film medium, a second compound objective lens system having an associated substantially fixed reflective means to direct the focused light raster pattern on the image area of said second film medium and a condensing lens to convey and direct the output radiant energy passed by the second film image area to said signal conversion system;

at least one of said basic optical systems being formed to accept the interior of a cooperating auxiliary optical system including an adjuvant objective lens, means for accommodating an additional film medium and an adjuvant condensing lens system formed to be inserted into and removed from the optical alignment of said basic system to facilitate the predeterminate handling of an additional film medium and an adjuvant condensing lens system formed to be inserted into and removed from the optical alignment of said basic system to facilitate the predeterminate handling of an additional film medium having an image area of a size differing from that inherently accommodated by said basic optical system;

a pair of reciprocating pivoted mirrors in the form of a first optical system pivoted output mirror and a second optical system pivoted input mirror, each being operative in a separate basic optical system, said first system output mirror being oriented adjacent the input receiving area of said signal conversion system in a manner to predeterminately move into position to reflect the output radiant energy of the first optical system into said signal conversion system, said second system input mirror being oriented adjacent to the face of said scanning means to predeterminately move into and out of the path of the moving beam light output of the scanning means to thereby direct said moving beam into said second optical system; and reflective placement means including selective switching means for simultaneously effecting and controlling reciprocative positioning of said pivoted mirrors in each of said optical systems to selectively utilize a respective basic optical system.

* * * * *

UNITED STATES PATENT OFFICE
CERTIFICATE OF CORRECTION

Patent No. 3,751,593 Dated August 7, 1973

Inventor(s) Thaddeus V. Rychlewski et al.

It is certified that error appears in the above-identified patent and that said Letters Patent are hereby corrected as shown below:

Column 4, line 32, "2-z" should read -- z-z --. Cancel Columns 5 and 6, and insert the attach sheets.

Signed and sealed this 12th day of February 1974.

(SEAL)
Attest:

EDWARD M.FLETCHER,JR.
Attesting Officer

C. MARSHALL DANN
Commissioner of Patents

ORM PO-1050 (10-69)
USCOMM-DC 60376-P69
★ U.S. GOVERNMENT PRINTING OFFICE : 1969 O—366-334.

25 to provide a substantially 90 degree mirror-eflected beam of light input 25' into the second optical system 1. This second basic system includes a second film positioning eans 99 for accommodating a second film medium 101 having a efined format and image area 103 substantially differing from hat of said first film medium 45. For example, the second ilm medium is a strip film having a series of images disposed hereon. The second film positioning means has strip film ransport means 105 formed to move the strip film imagery 103 elative to the scanning aperture 107 in the positioning means. The strip film medium is either of two types, slide film or motion picture film, both of which are accommodated by suitable known means incorporated into the second film positioning means wherein electronic shuttering may be utilized. The slide film type of strip film may be of various widths and having diverse image areas such as for example, 35 mm, 16 mm, super 8 mm or standard 8 mm strips or ribbons having disposed thereon substantially dissimilar still-photo image composition from frame-to-frame. The film transport means 105, for handling a strip film of this type, has single frame advancement provisions to provide determinate film stoppage for each separate film frame thereby

105 enabling a scanning period of desired duration. Specific means for accomplishing single frame film advancement are well known in the art and will not be described herein. Often the composition and still imagery content residual in each frame of this type of film medium is diversified to the extent that the time periods required for satisfactorily viewing of the individual frames may vary considerably. The activation of the single frame advancement means is accomplished either manually or by suitable coupling "x" with the master switching means 41. The other type of strip film accommodated in the second optical system 31, the motion picture medium, is one wherein the sequential frames contain related imagery. While the embodiment concept is applicable to any film size and image area format, 16 mm will be considered exemplary in this instance. The film transport means 105 for handling the motion picture medium is constructed in a conventional manner to move the film strip across the scanning aperture 107 at a consistent and required rate and is activated by suitable circuitry coupling "y" with the master switching means 41. The scanning of a moving picture film necessitates a scan modification, therefore, associated with this type of film transport means is a film movement sensing means 111 or film frame detector. This sensing means is responsive to the rapid movement of the film frames by, for example, detection of the sprocket hole locations on the film which provide pulsed signals representative of the rate of film frame movement through the film scanning zone. A vertical scan modification means 113 is coupled to the film movement sensing means 11, and thence through the switching means 41 to the signal combining network 115. In this network there is provided a composite vertical scan and vertical scan modification signal which is applied to the deflection apparatus 19 associated with the flying spot scanner tube 13. The horizontal drive circuitry 21 is also coupled to the deflection apparatus 19. For the detailed operation and interaction of the representative circuitry and associated apparatus, whereby motion picture scanning is accomplished, reference is directed to U.S. Patent 3,604,850 by R. R. Eckenbrecht et al: "Variable Speed Continuous Motion Film and Television Scan Synchronization". In such a system, the moving film can be stopped and an individual frame or frames thereof viewed as stills. When such stop-motion viewing is considered, pulsed signals from the film movement sensing means 111 are discontinued, whereupon the vertical scan modification means 113 is inactivated.

The optical components comprising the second basic system 31 include a second system objective lens 119 positioned to receive the reflected moving beam of radiant energy or scanning light 25' and focus the raster pattern thereof on the image area 103 of the second film medium 101. A second system condensing lens 121 collects the modified radiant energy passed by the second film image area 103 and controls the light to provide an output dimensional area "c'" which is acceptable by a second signal conversion system 123. Since this second signal conversion system is similar to the previously described first signal conversion system 57, it is not deemed necessary to further describe it at this time. The respective output signals from the second signal conversion system are applied by coupling means 125, 127, and 129 to the aforementioned common signal processing circuitry 75.

With reference to Figure 1C, the second basic optical system 31 is formed to accept a cooperating second auxiliary optical system 131 which is insertable into the basic system to accommodate an additional motion picture film medium of a size, format and image area differing from that initially accommodated by the optics of the basic system. By way of example, when the basic optical system 31 is constructed to handle a 16 mm motion picture medium, the system can be modified by the auxiliary system 131 to accommodate a different film size, such as super 8 mm. The second auxiliary system includes a second adjuvant holding means 133 which adequately accommodates the 8 mm film 101' and facilitates insertion into and removal of the auxiliary system 131 from the optical alignment of the second basic optical system 31. This second auxiliary system includes an adjuvant objective lens 135 which functions conjunctively with the second system objective lens 119, when brought into alignment therewith, to focus the scanning raster pattern on the film image area 103'. An adjuvant condensing lens 137 functions conjunctively with the second system condensing lens 121 to control the output dimensional area "c'" of the modified light beam 25' which is passed by the image area of the film.

Operationally, the various film handling and optical aspects of the aforedescribed multiplex film image accommodation section 27 are primarily controlled by the master switching means 41. When automated operation is desired, a programming means 138, comprising, for example, magnetic or punched tape and appropriate sensing means therefor, is coupled to the master switching means to provide selective activation of the respective optical systems and the film handling media therein.

Another embodiment of the pivoted reflective means 33' is shown in Figure 1D wherein the pivoted mirror effects substantially 90 degree movement. This pivotal angular movement is referenced from plane "A" which is substantially parallel to and spaced from the direct beam path 25 emanating from the axis of the raster pattern of the scanning tube 13. The initiative 90 degree movement being determined, by the aforenoted mirror